Patented Aug. 11, 1931

1,818,781

UNITED STATES PATENT OFFICE

STEFAN BAKONYI, OF BUDAPEST, HUNGARY, ASSIGNOR TO DEUTSCHE HYDRIER-WERKE AKTIENGESELLSCHAFT, OF BERLIN-CHARLOTTENBURG, GERMANY

METHOD OF CARRYING OUT BIOCHEMICAL PROCESSES

No Drawing. Application filed October 5, 1927, Serial No. 224,285, and in Germany June 19, 1927.

This invention relates to a method for carrying out biochemical processes, more especially processes of fermentation. There are several biochemical processes which are at present utilized for technical purposes as, for instance, the fermentation of carbohydrates by means of yeast and bacteria for producing ethyl alcohol, lactic acid, butyric acid, butyl alcohol, isopropyl alcohol, acetone, etc.

I have now discovered that:—

I. It is not best, as hitherto usual, to employ pure cultures in biochemical processes; on the contrary, the use of natural mixed bacteria affords special advantages. In these cultures the micro-organisms show an obvious virility by far superior to that of pure cultures; besides they grow without being dependent upon each other, i. e. without entering a proper symbiosis.

While the single tribes of micro-organisms are capable of occasionally consuming their mutual degradation or metabolism products and thereby decreasing the amount of undesired waste products (which is most important for the total effect), this is not to be regarded as symbiosis, but as "metabiosis".

II. These natural mixed bacteria must be attached to a solid biochemically convertible substrate, that is to say, a carrier which is subject to change by the biochemical action of the bacteria, as, for example, particles of grain. In the culture thus formed the micro-organisms act substantially as they act under the conditions in which they occur in nature.

III. Particularly effective inciters of biochemical processes may be obtained by systematic selection and propagation in the presence of small quantities of the substances which are to be exclusively or chiefly produced; for example, ethanol, butanol, acetone, butyric acid and lactic acid. The quantity of such substances should be small enough so that the substances will not be consumed as nutrients by the bacteria.

When proceeding according to the principles above indicated, I attain the following advantages in carrying out the processes of fermentation and other biochemical processes:

1. The cultures as described are very resistant against external attacks. For instance the development of intruders is inhibited from the very beginning. In the culture the micro-organisms are maintained in their natural medium with attendant advanages. All suspensions containing a sufficient amount of well distributed cereals such as Indian corn, rice and potatoes are thoroughly fermented by these cultures without any previous treatment, without nutrient additions and without any previous cultivation of the ferment.

2. By suitable selection it is possible to obtain cultures having widely different fermenting properties representing almost the entire range of the natural splitting and oxidation processes and cultures which are particularly effective in biochemical processes as regards both quantity and quality of product. In this way an effective control of the processes, the production of distinct products and the increase of their production at the expense of other undesired products becomes possible.

3. Because of the metabiotic properties of the cultures described unserviceable products of fermentation are eliminated or converted to useful products.

4. Owing to the incomparable higher virility of the cultures by far shorter fermentation periods are required.

5. Furthermore this increased virility as well as the elimination of noxious metabiotic products permits employing far higher concentrations than in the case of pure cultures. As is well known the metabiotic products ordinarily interfere with the biochemical processes. This difficulty is avoided.

In carrying out biochemical processes other than fermentation, the application of the above described principles offers the same advantages.

According to the described selection principles the culture consisting of mixed bacteria may be prepared in the following manner:—

A natural carrier of bacteria, such as a part of plants, humus, manure, waste water, slime, or a mixture of said substances is covered by tap water to which is added a quantity of the desired fermentation product as, for example, alcohol, to provide a concentration of about 1%. (Of course, if the fermentation is to furnish a mixture of products then a mixture of said substances, instead of the single one is added to the tap water.) By this addition the growth of micro-organisms not resistant to the product is prevented. Samples of the bacteria are incubated for about 24 hours at temperatures up to 70° C., but preferably at temperatures between 28 and 38° C. After 24 hours all samples subjected to the preliminary fermentation for the moment form an undifferentiated mixture of micro-organisms resistant to the fermentation product.

The next step consists in selecting by examination under the microscope the best of the samples, all those being discarded in which a considerable number of strongly degenerated (granulated or deformed) individuals are found. Only the samples in which the micro-organisms show good protoplasma and normal shape are chosen for further development, these two characteristics proving that the different bacteria are at least compatible. The selected samples may be advantageously further examined, preferably using fixed and colored preparations, to preserve only the best samples. The samples to be further propagated are those in which the micro-organisms show fixation to the solid nutrient substrata and formation of culture.

Sterilized nutrient substrata containing about 1% of the proposed fermentation product is then inoculated with the selected samples. The inoculated samples are again incubated for 24 hours, whereupon the above described selection by examination under the microscope is repeated. Heating of the samples which is usual in connection with the isolation methods heretofore used should be avoided, as I have found that the most important non-sporiferous forms of bacteria are killed by heat and the formation of cultures is prevented.

The foregoing propagating and selecting operations are repeated until cultures of satisfactory normal appearance showing strong attachment to the substrata are obtained.

For the purpose of further selection fermentation experiments may be conducted by inoculating the suspension or solution which is to be fermented with samples of the cultures developed, about 1% of the desired fermentation product to be formed being first added to such suspension or solution. After this experimental fermentation, those samples of the cultures are selected which have effected fermentation most satisfactorily and in the shortest time. In making the selection of cultures the samples of fermentation products are examined to ascertain which samples show the highest percentage of the desired fermentation product. This may be done, for example, by distilling aseptically taken samples.

The cultures selected as the result of these steps are further propagated and again selected until a culture effecting a maximum output with the shortest time of fermentation is obtained.

During the procedure of development of cultures by successive propagation and selection, the amount of the product to be produced which is added for the purpose of preventing the growth of undesired bacteria is gradually reduced until finally the bacteria are so developed that a suitable material can be fermented to provide the desired product without the preliminary addition of said desired product.

Finally the concentration of the suspension or solution is increased as long as this can be done without reducing the output or extending the time of fermentation. It will be obvious that the successive development and selection can be carried further, if desired. For example, sample cultures may be propagated and selected to retain the cultures which are most resistant to infection.

*Examples*

(1) For producing a mixture of ethanol, propanol, isopropanol, butanol, isobutanol, acetone, etc. by means of the above described mixed cultures, I may proceed as follows:

Amylaceous materials in a finely distributed form are suspended in water, the concentration being the same as usual in the art of brewing, if desired. The amylaceous material is gelatinized by boiling and cooling down to the selection temperature of the ferment. To the wort so formed approximately 1% of a mixture of the products to be produced is added. The ferment is then added and grows rapidly soon populating the whole of the fluid by swarmers of the cultures introduced.

The fixation of bacteria to the carrier to form cultures and an intensive fermentation take place. The fermentation is completed within 48 hours. The products produced may be separated by distillation. The alcohols and ketones produced approximate 40% of the starch used.

Substances containing sugar must be mixed with a small quantity of amylaceous material to permit the formation of cultures.

(2) A modification of the process is carried out as follows:

A filter body of suitable dimensions is made of slag, broken stones or the like and filled with a mash fermented according to the above description. After 4 to 6 hours the mash is withdrawn and fresh unfermented mash is added. After 8 to 12 hours the fresh mash is withdrawn and the fermented mash is again added. The whole process is repeated for some weeks, whereupon most effective filter bodies, solid agglomerates, of culture are obtained. Such "initiated" fermenting filters are used for preparing the above described mixtures by pouring upon them from the top the mash to be fermented and withdrawing it at the bottom when completely fermented.

(3) If it is desired to bring about oxidative fermentations according to my new process, the above described selective method is modified in that instead of alcohol free organic acids, such as lactic, butyric or acetic acid are added, according to the nature of the desired final product.

Furthermore the resulting acid after having exceeded the concentration of 2% is partially neutralized with chalk, carbonate of soda, ammonia, etc. The free acid always present acts as specific selective liquid and produces cultures which highly resist acids. In operation of the process for producing organic acids an oxidative culture of this kind is added to the suspension or solution, and the resulting acid is likewise continuously neutralized to prevent its concentration exceeding 2%. Aseptic working is not necessary in this case, the cultures obtained in accordance with the described selective method absolutely resisting infection. The resulting acids are set free and the pure acids are obtained in the usual manner.

I claim:—

1. The method of carrying out bacterial fermentation processes, which comprises subjecting natural mixed bacteria to a selective method substantially consisting in the addition of selecting means in the form of the substances to be produced by such fermentation process, repeatedly inoculating mashes with the material thus obtained, selecting from such mashes the most virulent ones, and then subjecting the substance to be treated to the cultures thus selected.

2. The method of carrying out a bacterial fermentation process which comprises developing a culture of mixed bacteria selectively destroying undesired bacteria by subjecting the mixture to a solution of the products to be produced by the fermentation process, developing a culture of the surviving bacteria, subjecting the bacteria of the new culture to the products to be produced by the fermentation process to destroy the undesired bacteria and using the surviving strain of bacteria for the fermentation of the material to be treated.

3. The method of carrying out bacterial fermentation processes which comprises propagating natural mixed bacteria in the presence of dilute solutions of the substance to be produced, fixing the propagated bacteria on substrata to form a culture and subjecting the substance to be fermented to the action of said cultures.

4. The method of carrying out bacterial fermentation processes which comprises propagating natural cultures in a wort containing substantially 1% of the substance to be produced and subjecting the substance to be fermented to the cultures so formed.

5. The method of carrying out bacterial fermentation processes which comprises subjecting mixed bacteria to a nutrient solution containing approximately 1% of the substance to be produced and then subjecting the substance to be fermented to the cultures thus selected.

6. The method of preparing bacterial cultures for use in a fermentation process which comprises propagating natural mixed bacteria in a solution containing approximately 1% of the substance to be produced by the fermentation process, successively selecting and re-propagating to produce an effective culture.

7. The method of preparing bacterial cultures for use in a fermentation process which comprises propagating a number of samples of natural mixed bacteria in a solution containing approximately 1% of the substance to be produced by the fermentation process, examining the samples propagated under the microscope and selecting those showing good protoplasma and normal shape, and further propagating the cultures of the samples selected.

8. The method of preparing bacterial cultures as defined in the preceding claim, further characterized that the propagation is conducted at a temperature between 28 and 38° C.

In testimony whereof I affix my signature.

STEFAN BAKONYI.